Dec. 14, 1948. J. S. ABER 2,456,356
PACKING GASKET AND STATIC SEAL
Filed Dec. 9, 1947
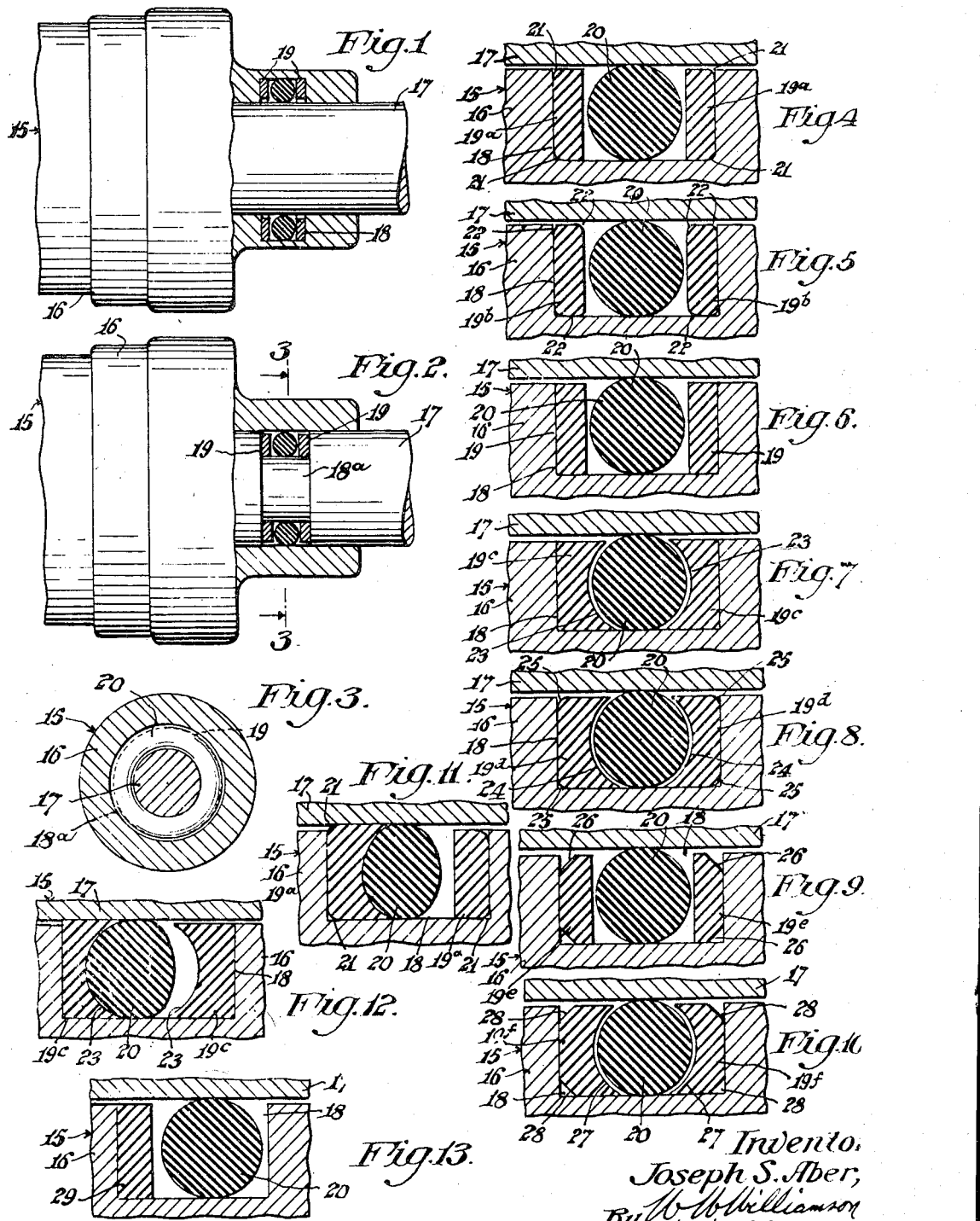
Inventor
Joseph S. Aber,
By W. W. Williamson
Attorney Patented Dec. 14, 1948

2,456,356

UNITED STATES PATENT OFFICE 2,456,356

PACKING GASKET AND STATIC SEAL

Joseph S. Aber, Philadelphia, Pa.

Application December 9, 1947, Serial No. 790,635

8 Claims. (Cl. 286—26)

1

My invention relates to a new and useful packing gasket and static seal and is a continuation in part of my copending application Serial No. 659,604, filed April 4, 1946, now Patent No. 2,437,586, issued March 9, 1948.

An object of the present invention is to simplify the structure of the above mentioned device without sacrificing any of the advantages obtained by the packing gasket and static seal disclosed in the former application.

Another object of the invention is to provide a packing gasket and static seal having novel structural features for use in closing a passageway between a reciprocating rod, plunger, piston and the like, and its cylinder or housing, in connection with hydraulic, air, water or chemical apparatus covering a wide range of pressures and within a considerable range of temperatures.

A further object of the invention is to provide a packing gasket and static seal consisting of one or more expansible and contractible restraining members in the form of substantially flat rings of elastomeric material in association with an O-ring functioning as a seal and an actuator for the restraining member to cause the latter to expand radially throughout 360 degrees when pressure is applied to the actuator ring in an axial direction and permit the restraining member to contract when the pressure is relieved.

A further object of this invention is to provide a packing gasket and static seal comprised of one or more restraining rings and an O-ring all having suitable resilient, elastic and temporarily deformable attributes, such as rubber, rubber compositions or other elastomeric materials so that, in effect, the packing gasket "breathes" during operation.

A still further object of the present invention is to provide a packing gasket and static seal comprised of one or more definitely resilient elastic restraining rings having exterior or interior diameters approximating the diameter of the bottom of the groove in which they are used, and according to whether the groove is an exterior or interior one, and a resilient elastic actuator or O-ring of greater cross sectional diameter than the groove to fill the space between the bottom of the groove and a grooveless element of a fluid pressure mechanism, said actuator ring coacting with a restraining ring to extrude the latter radially when pressure forces the actuator ring in a direction parallel to its axis, thereby forming a barrier across any space circumferentially beyond the groove and when the pressure is relieved from the actuator ring the extruded

2 perimeter of the restraining ring will recede to its normal position and condition because of the inherent contractible quality of said restraining ring.

With the above and other objects in view this invention consists of the details of construction and combination of elements hereinafter set forth and then designated by the claims.

In order that those skilled in the art to which this invention appertains may understand how to make and use the same, I will describe several constructions in detail, referring by numerals to the accompanying drawing, forming a part hereof, in which:

Fig. 1 is a fragmentary sectional elevation of a fluid pressure mechanism including a cylinder and reciprocating rod showing an application of the invention in the cylinder or stationary element of said mechanism.

Fig. 2 is a similar view illustrating the invention as applied to the reciprocating element of the fluid pressure mechanism.

Fig. 3 is a cross sectional view on the line 3—3 of Fig. 2.

Figs. 4 to 10, inclusive are enlarged fragmentary sectional views of the invention applied to one of two relatively movable members, the same being equally applicable to the rod-like member or the cylindrical member, and showing the rings at rest or in a neutral position.

Figs. 11 and 12 are similar views illustrating the device under pressure entering from the right hand side of each figure.

Fig. 13 is also a similar view depicting only one restraining member or ring and the actuator member or ring at rest or in a neutral position, for use in installations where there is practically no back pressure.

In carrying out the invention as herein embodied 15 represents a conventional fluid pressure apparatus, shown only for illustrative purposes, and disclosed as including a cylinder 16, housing or the like, in which the reciprocating plunger rod 17, shaft or the like, operates.

In Fig. 1 the cylinder, housing or the like, constituting one of the members of the fluid pressure apparatus, has a circumferential packing groove 18 in its inner circumference so as to surround the other member 17, while in Fig. 2 said other member 17 has a circumferential packing groove 18a in its outer circumference so as to be homocentric to the cylindrical member 16.

For purposes of illustration only, the enlarged views, Figs. 4 to 13, inclusive, are shown as parts of Fig. 1, but it is to be understood that in either packing groove 18, 18a, in either member 16, 17, of an apparatus designated 15, are fitted two substantially flat restraining rings, or members 19, Figs. 1, 2, 3 and 6, with an actuator or O-ring or member 20, normally round in cross section, between them. These rings are composed of resilient, flexible and elastic material, such as rubber composition, including synthetic rubber compositions, or elastomeric substances.

The restraining rings or members are, normally, of the same radial extent as the packing groove in the apparatus member in which said restraining rings or members are mounted, leaving a slight clearance between the inner or outer peripheral edge, as the case may be, and the other apparatus member. The cross sectional diameter of the actuator ring or member 20 is slightly greater than the distance between the bottom wall of the packing groove of either apparatus member in which said actuator ring or member is mounted and the opposed wall of the companion apparatus member. This causes said actuator ring or member to be compressed a fractional part of its radial dimension and expanded in its axial dimension between the restraining rings or members and produces a static seal.

In actual practice, the major or expanded cross sectional diameter of the actuator ring or member, when assembled, is approximately the same as or slightly less than the distance between the two cooperating restraining rings or members to permit direct application of pressure to said actuator ring or member.

The restraining rings or members may be formed in any suitable and desirable cross sectional configuration. For example, the restraining rings 19a, Fig. 4, may have rounded edges 21 along the inner and outer circumferences at the outside faces or the rings 19b, Fig. 5, may have rounded edges 22 along the inner and outer circumferences at both the inside and outside faces. In another style the restraining rings or members 19c, Fig. 7, have circumferential grooves 23, concave in cross section, in the inner faces while the outer faces form right angles with both the inner and outer circumferences of said rings or similarly fashioned rings 19d, Fig. 8, may have circumferential grooves 24, concave in cross section, in the inner faces, and may have rounded edges 25 along the inner and outer circumferences at the outside faces. Further, said restraining rings 19e, Fig. 9, can have flat side faces and be provided with beveled edges 26 along the inner and outer circumferences at the outside faces or such rings as 19f, Fig. 10, can have circumferential grooves 27, concave in cross section, in the inner faces and provided with beveled edges 28 along the inner and outer circumferences at the outside faces. By eliminating square corners the chances of extruding ridges of the ring material into the space between the component members of the packed apparatus is reduced to a minimum and by producing the inner faces of arcuate formation more extended packing surfaces are provided. In all cases the actuator ring 20 is the same.

When pressure is applied to the packing gasket and static seal, the actuator ring or member 20 is forced against the opposed restraining ring, as shown in Figs. 11 and 12, which will compress said opposed restraining ring or member axially and expand it radially thus temporarily deforming said opposed restraining ring and causing it to bridge the clearance space between the members of the fluid pressure or other packed apparatus to set up a barrier which will effectively prevent passage of fluid beyond the position or location of said packing gasket seal. When the pressure is removed the rings will return to their normal positions and conditions due to their inherent resiliency and elasticity and the actuator ring will still function as a static seal.

In Fig. 13 I have illustrated the invention as comprised of a single restraining ring 29, which may be of any cross sectional configuration, such as those depicted in Figs. 4, 5 and 7 to 10, inclusive, because all rings, of the same outside and inside diameters are interchangeable, and the actuator or O-ring or member 20. These two rings are fitted in a packing groove 18, 18a which should be of appropriate width to accommodate merely the two rings. This form of the device is particularly useful for assembly in apparatus where the operating pressure always is applied in one and the same direction and there is practically no back pressure.

It is apparent that the invention may utilize many different embodiments, the gist thereof being the employement of one or more independent restraining rings in which the cross sectional diameter of each is less than the distance between the bottom of a packing groove in one apparatus member and the opposed wall of a companion apparatus member, and an independent actuator ring, round in cross section, the diameter of which is the same as or slightly greater than said distance between the bottom of the packing groove and the opposed wall of the companion apparatus member, whereby, when pressure is applied to said actuator ring, the latter will compress a restraining ring in a direction axially thereof and temporarily expand such restraining ring radially to form an effective barrier against the passage of fluids under pressure and, therefore, I do not wish to be limited to the exact details of construction specifically disclosed, as these may be varied within the scope of the appended claims without departing from the spirit of the invention.

Having described the invention, what is claimed as new and useful is:

1. In a fluid pressure apparatus, a pair of relatively movable elements, one of said elements having a packing groove therein concentric with the adjacent wall of the other of said elements, a restraining ring of elastomeric material seated in said packing groove and having a cross sectional radial dimension substantially equal to the depth of said packing groove, and a toroidal actuator ring of elastomeric material normally round in cross section also seated in said packing groove beside the restraining ring, said actuator ring having a greater cross sectional diameter than the distance between the bottom of the groove and the adjacent wall of said other element to provide a seal between the apparatus elements and when acted upon by pressure in a direction towards the restraining ring said actuator ring will be forced against said restraining ring to expand the latter radially to form a barrier across the clearance space between the two elements, said restraining ring retracting upon relief of pressure from the actuator ring.

2. The structure of claim 1 wherein the restraining ring has a beveled corner between the outer circumference and the outer face thereof.

3. The structure of claim 1 wherein the restraining ring has a beveled corner between the inner circumference and the outer face thereof.

4. The structure of claim 1 wherein the restraining ring has beveled corners between the outer and inner circumferences and the outer face thereof.

5. The structure of claim 1 wherein the inner face of the restraining ring is provided with a circumferential groove concave in cross section.

6. In a fluid pressure apparatus, a pair of relatively movable elements, one of said elements having a packing groove therein concentric with the adjacent wall of the other of said elements, a restraining ring of elastomeric material having a radial cross sectional dimension normally less than the distance between the bottom of the groove and the adjacent wall of said other element, and an actuator ring of elastomeric material having a cross sectional diameter slightly greater than the distance between the bottom of the packing groove and said adjacent wall of said other element and coacting with the restraining ring to expand the latter radially against said adjacent wall of said other element when the actuator ring is under pressure and said restraining ring contracting when the pressure is relieved.

7. In a fluid pressure apparatus, a pair of relatively movable elements, one of said elements having a packing groove therein concentric with the adjacent wall of the other of said elements, a pair of restraining rings of elastomeric material seated in spaced relation in said packing groove and each having a cross sectional radial dimension substantially equal to the depth of said packing groove, and a toroidal actuator ring of elastomeric material normally round in cross section also seated in said packing groove between the restraining rings, said actuator ring having a greater cross sectional diameter than the distance between the bottom and said adjacent wall of said other element to provide a static seal between the apparatus elements and when acted upon by pressure in a direction towards either restraining ring said actuator ring will be forced against said restraining ring to expand the latter radially to form a barrier across the clearance space between the two elements, said restraining ring contracting when the pressure is relieved.

8. The combination with a fluid pressure apparatus including a pair of relatively movable elements, one of which has a circumferential packing groove therein concentric with the adjacent wall of the other element, of a set of three rings of elastomeric material fitted in said packing groove and resting against the bottom wall thereof, the central ring being of toroidal form and extending fully from the bottom of the packing groove to said adjacent wall of said other apparatus element and the circumferences of the other rings distant from the bottom of the packing groove normally terminating short of the adjacent wall of said other apparatus element and either of said other rings being expanded against said adjacent wall by the central ring when pressure is applied to the latter and the expanded ring contracting when the pressure is relieved.

JOSEPH S. ABER.

REFERENCES CITED

The following references are of record in the file of this patent:

UNITED STATES PATENTS

| Number | Name | Date |
| --- | --- | --- |
| 2,427,787 | Hunter | Sept. 23, 1947 |
| 2,427,789 | Kehle | Sept. 23, 1947 |
| 2,427,814 | Hallen | Mar. 16, 1948 |